United States Patent [19]

Tork et al.

[11] 4,230,812

[45] Oct. 28, 1980

[54] PIGMENT PREPARATIONS

[75] Inventors: Leo Tork; Günter Kolb, both of Leverkusen; Wolfgang Höhne, Bergisch-Gladbach, all of Fed. Rep. of Germany

[73] Assignee: Bayer Aktiengesellschaft, Leverkusen, Fed. Rep. of Germany

[21] Appl. No.: 3,582

[22] Filed: Jan. 15, 1979

[30] Foreign Application Priority Data

Jan. 17, 1978 [DE] Fed. Rep. of Germany ....... 2801817

[51] Int. Cl.$^2$ ..................... C09B 67/00; D06N 3/08; D06P 3/32
[52] U.S. Cl. .................................. 526/320; 8/94.2; 260/42; 260/42.21; 260/42.52; 526/325
[58] Field of Search .................. 526/320, 325; 260/42, 260/42.21, 42.52; 8/94.2

[56] References Cited

U.S. PATENT DOCUMENTS

| | | | |
|---|---|---|---|
| 2,828,220 | 3/1958 | McWherter et al. ................. | 8/94.21 |
| 3,425,863 | 2/1969 | Honig et al. ......................... | 427/387 |
| 3,622,532 | 11/1971 | Kolb .................................... | 260/29.6 H |
| 3,642,750 | 2/1972 | Wegemund et al. ............... | 260/42.52 |
| 3,770,490 | 11/1973 | Parker ................................. | 526/320 |
| 3,780,003 | 12/1973 | Seymour et al. ..................... | 526/320 |
| 3,853,822 | 12/1974 | Brod et al. ........................... | 526/320 |
| 3,963,685 | 6/1976 | Abrahams ............................ | 526/325 |
| 3,970,633 | 7/1976 | Miller et al. ......................... | 526/320 |
| 4,137,389 | 1/1979 | Wingler et al. ...................... | 526/320 |

FOREIGN PATENT DOCUMENTS 859297 1/1961 United Kingdom ..................... 526/320

*Primary Examiner*—Ronald W. Griffin
*Attorney, Agent, or Firm*—Sprung, Felfe, Horn, Lynch & Kramer

[57] ABSTRACT

Pigment preparations containing 2–70 % by weight, relative to the total preparation, of an inorganic or organic pigment dispersed in a solution of 10 to 49% by weight, relative to the total preparation, of a water-insoluble copolymer in an organic solvent, the copolymer containing 40–60% by weight of acrylic acid ethyl ester, 30–50% by weight of methacrylic acid methyl ester and 5–15 % by weight of acrylic acid hydroxyethyl and/or hydroxypropyl ester or methacrylic acid hydroxyethyl and/or hydroxypropyl ester and being prepared at 50°–170° C. in the presence of 0.5–5.0% by weight, relative to the sum of the monomers, of an organic per-compound or an azo compound which supplies free radicals at 50°–170° C., in an organic solvent, and their use for pigmenting dressing agents for leather and imitation leathers.

8 Claims, No Drawings

PIGMENT PREPARATIONS

The invention relates to pigment preparations and their use for pigmenting water-insoluble dressing agents for leather and imitation leather.

It is known to colour water-insoluble dressing agents, for leather and imitation leather, based on polyurethanes or water-soluble cellulose esters with pigment preparations. The pigment preparations used for this purpose usually also contain, in addition to the pigment and customary additives, such as solvents, pigment-binders based on collodion, cellulose acetate, cellulose acetylbutyrate, ethylcellulose or polyvinyl chloride/-polyvinyl acetate copolymers, plasticisers optionally being added. These pigment preparations have an adverse effect on the properties of the dressing agents for leather and imitation leathers and of the finished articles. In particular, they harden the leather or imitation leather, reduce the wet and dry resistance to flexing and impair the resistance to cold.

Attempts are made to avoid these disadvantages by using as binders for pigments the same or similar polyurethanes as are used as binders in leather dressing or during the coating of imitation leather. Some of the disadvantages indicated can be removed in this way; however, it is necessary for a precisely matched pigment preparation to be employed for each dressing, since, for example, polyurethanes are compatible with one another and with collodion and with other cellulose derivatives only to a very limited extent.

There was thus a need for pigment preparations which can be universally employed for all dressing agents for leather and imitation leather, and furthermore do not have the disadvantages of known pigment preparations.

The invention thus relates to pigment preparations containing 2 to 70% by weight of a inorganic or organic pigment, dispersed in a solution of 10 to 49% by weight of a water-insoluble copolymer in an organic solvent, the copolymer containing 40 to 60% by weight of acrylic acid ethyl ester, 30 to 50% by weight of methacrylic acid methyl ester and 5 to 15% by weight of acrylic acid hydroxyethyl and/or hydroxypropyl ester or methacrylic acid hydroxyethyl and/or hydroxypropyl ester and being prepared at 50°-170° C. in the presence of 0.5 to 5.0% by weight of an organic per-compound or of an azo compound which supplies free radicals at these temperatures, in an organic solvent.

The percentage data relates to the total preparation or to the copolymer.

Preferred copolymers have softening points from −5° C. to +25° C. The copolymers are preferably prepared by the solution process, in cyclohexanone, dimethylformamide or ethylglycol.

The pigment preparations can contain customary additives if appropriate, such as formulating agents or thickeners.

Suitable solvents for producing the pigment preparations are alcohols, such as isobutanol, cyclohexanol, tert.-butanol, diacetone-alcohol, ethylglycol or glycol monomethyl ether, ketones, such as methyl ethyl ketone or cyclohexanone, esters, such as acetic acid butyl ester, phthalic acid dimethyl ester or ethylglycol acetate, or acid amides, such as dimethylformamide or methylpyrrolidone, and a proportion of hydrocarbons, such as benzene, toluene or xylene. Cyclohexanone, dimethylformamide and ethylglycol are preferred.

Known per-compounds, such as diacyl peroxides, peresters or perketones, or azo compounds, such as azodiisobutyric acid dinitrile, which are soluble in an organic medium can be used as the agents which supply free radicals. If cyclohexanone is employed as the solvent, the copolymers exhibit a very low chemical non-uniformity and thus possess an excellent coating effect, that is to say they prevent, to a high extent, flooding of the pigments, above all when mixtures of inorganic and organic pigments are used.

The pigment preparations can be produced in a simple manner by dispersing the components in a customary wet comminution apparatus, for example a rotor-stator mill, a bead mill or a ball mill. The particle size of the dispersed pigments should be 0.2–2μ. There is no restriction on the pigments which are incorporated into the pigment preparations according to the invention; they can be of an organic or inorganic nature. Examples of suitable organic pigments are those of the azo, anthraquinone, azoporphine, thioindigo, dioxazine, naphthalenetetracarboxylic acid or perylenetetracarboxylic acid series, as well as dyestuff lakes, such as Ca lakes, Mg lakes or Al lakes of dyestuffs containing sulphonic acid groups and/or carboxylic acid groups, a large number of these pigments being known, for example, from the Colour Index 2nd edition. Examples of suitable inorganic pigments are zinc sulphides, cadmium sulphides or selenides, ultramarine, titanium dioxides, iron oxides, nickel compounds or chromium compounds and carbon black.

Organic dressing agents, for leather, which can be coloured with the pigment preparations according to the invention are described, for example, in German Pat. Nos. 1,174,937 and 1,278,064. Almost all binders which are soluble in organic solvents can be pigmented with the pigment preparations according to the invention. The preparations are particularly suitable for pigmenting aromatic and aliphatic polyurethane single-component systems, and also two-component systems containing amine, and for lacquers based on cellulose derivatives, such as are used for dressing leather or imitation leathers. The choice of pigment preparations is made according to the desired colour effect. If a high hiding power is desired, preparations of inorganic pigments are used; on the other hand, if the substrate treated has a transparent colour shade of high brilliance, preparations with organic pigments are used. The fastness properties, such as fastness to light and migration, and heat stability and the like predetermined by the pigment are also taken into consideration.

Compared with known pigment preparations, the pigment preparations according to the invention have the advantage that they are very simple to produce, can be universally employed and do not have an adverse effect on the properties of the dressing agents to be pigmented or on the substrates, and in particular do not impair the fastness properties, predetermined by the pigments. If has been found, surprisingly, that the polyacrylates employed as the coating resin for the pigments should be thermoplastic at room temperature and should have softening points between −5° C. and +25° C. After evaporating off the solvents in drying tunnels, they form, at room temperature from their solutions in organic solvents, non-porous films with the adjusted hardness and elasticity. In contrast, acrylate resins which are too soft give dressings with a tacky handle and poor resistance to rubbing when hot. Acrylate resins which are too hard give dressings with poor resistance to cold and low wet and dry resistance to flexing. The addition of known plasticisers of the adipic acid ester or phthalic acid ester type indeed counteracts hardening, but these compounds migrate more or less rapidly, whereby the softening is made ineffective and the surface of the layer of dressing becomes sticky.

If mixtures of diverse pigments are used, flooding of, above all, the inorganic pigments occurs in pigment preparations with binders based on cellulose or polyvinyl acetate. This is prevented by the pigment preparations according to the invention, and the compatibility with the most diverse coating agents is improved in an optimum manner, so that they can be used universally for colouring binders, for example even those for textile printing.

EXAMPLE 1

8 kg of cyclohexanone are initially introduced into a VA autoclave with an anchor stirrer, the air is removed from the space in the autoclave and a solution of 20 kg of acrylic acid ethyl ester, 16.8 kg of methacrylic acid methyl ester, 3.2 kg of acrylic acid hydroxyethyl ester and 1 kg of benzoyl peroxide in 32 kg of cyclohexanone are pumped in in the course of 2½ hours at an external temperature of 130° C. After a total polymerisation time of 5 hours, a 50% strength polymer solution is obtained. The isolated copolymer has softening point of +7° C. and can be employed as a pigment-binder for the production of pigment formulations.

6 kg of pigment-binder are diluted with 3.07 kg of cyclohexanone and 30 g of triethanolamine, 900 g of carbon black 170S (gas black, Messrs. Degussa) are introduced and the mixture is stirred at 2,000 revolutions/minute for 20 minutes using a dissolver. The carbon black dispersion is then ground once or twice on a bead mill with glass beads of 1 mm diameter, with cooling, until the required depth of black and hiding power are achieved.

A black-pigmented collodion varnish which is employed for dressing leather can be produced from the pigment formulation as follows:

(a) Pigmenting a collodion solution.

50 g of the carbon black formulation are added to a solution which consists of 32 g of an ester-soluble collodion wool (butanol-moist, 65% strength, standard type 9E), 40 g of di-n-butylphthalate, 15 g of castor oil, 50 g of 2-ethyl-n-hexyl acetate and 813 g of butyl acetate, whilst stirring. After a stirring time of 5 minutes, an inintensely black-coloured collodion varnish is obtained, which is particularly suitable as a high-gloss final finish on buffed and full grain leathers.

(b) Pigmenting of a collodion varnish which can be emulsified in water.

50 g of the carbon black formulation are added to a solution which consists of 53 g of an ester-soluble collodion wool (butanol-moist, 65% strength, standard type 15E), 24 g of di-n-butylphthalate, 4 g of castor oil, 8 g of butyl stearate, 110 g of 2-ethyl-n-hexyl acetate, 12 g of benzyl alcohol, 185 g of n-butyl acetate, 2 g of triethanolamine, 15 g of di-n-octyl sodium sulphosuccinate and 12 g of an addition product of about 20 mols of ethylene oxide and 1 mol of nonylphenol, whilst stirring. After the pigment dispersion has been distributed thoroughly, the mixture is emulsified with 525 g of water. The resulting black emulsion, which can be diluted with water, is very suitable as a dark black finishing agent for thermoplastically dressed, buffed and full grain leather.

The carbon black formulation is also very suitable for pigmenting a two-component polyurethane for varnishing leather by the cold varnish process:

15 g of the carbon black formulation are added to a solution which consists of 70 g of a crosslinkable polyester which has a low degree of branching and has terminal OH groups, 30 g of ethyl acetate, 20 g of butyl acetate, 20 g of cyclohexanone and 10 g of methylglycol acetate, whilst stirring with a high-speed stirrer at a speed of 200-300 revolutions/minute. After a stirring time of 5 minutes, a finely distributed, stable pigment dispersion is obtained which, after adding 41 g of a polyisocyanate, prepared by reacting 1 mol of trimethylolpropane and 3 moles of toluylene isocyanate, and a heavy metal salt as an accelerator, is suitable for varnishing leather by the cold varnish process. The patent leathers produced with this dispersion by known processes are coloured uniformly and free from specks. The black shade is bloomy and of high gloss. The polyester used is prepared from adipic acid, diethylene glycol and trimethylolpropane and has an average molecular weight of 1,000 to 3,000.

EXAMPLE 2

A monomer solution consisting of 19 kg of acrylic acid ethyl ester, 17 kg of methacrylic acid methyl ester, 4 kg of methacrylic acid hydroxypropyl ester and 1 kg of azodiisobutyric acid dinitrile in 40 kg of cyclohexanone is polymerised as described in Example 1. The 50% strength solution of the polymer can be employed direct for producing a pigment preparation. The isolated copolymer has a softening point of +10.5° C. and can be employed as a pigment-binder for producing pigment formulations.

2.7 kg of pigment-binder are diluted with 1.3 kg of dimethylformamide, 6 kg of titanium dioxide pigment Bayertitan RC-K-20 are introduced and the mixture is stirred at 2,000 revolutions/minute for 15 minutes, using a dissolver. After grinding on a bead mill, a well-dispersed pigment paste which is stable on storage is obtained.

A pigmented polyurethane solution, which is used for coating textiles, can be produced from the pigment formulation as follows:

(a) Pigmenting a single-component polyurethane.

8 g of the titanium dioxide pigment formulation are added to a solution which consists of 25 g of a polyurethane, 45 ml of dimethylformamide and 30 ml of methyl ethyl ketone, whilst stirring with a high-speed stirrer at a speed of 200-300 revolutions/minute. After a stirring time of 3-5 minutes, a finely divided, stable pigment dispersion is obtained, which is very suitable for coating textiles by the reverse coating process. The polyurethane films produced with this dispersion on textiles by known processes are coloured uniformly and free from specks. The single-component polyurethane used is prepared from a polyester of adipic acid and hexanediol/neopentylglycol with an average molecular weight of 500-3,000 and diphenylmethane-4,4'-diisocyanate, and subsequent reaction with butanediol.

(b) Pigmenting a two-component polyurethane.

After adding 5 g of methyl ethyl ketone to a solution which consists of 30 g of a crosslinkable polyurethane with terminal OH groups and 70 g of ethyl acetate, 8 g of the titanium dioxide pigment formulation are added, whilst stirring with a high-speed stirrer at a speed of 200-300 revolutions/minute. After a stirring time of 3-5 minutes, a finely divided, stable pigment dispersion is obtained, which, after adding a polyisocyanate, prepared by reacting 1 mol of trimethylolpropane and 3 mols of toluylenediisocyanate, and a heavy metal salt as an accelerator, is suitable for coating textiles by the reverse coating process or direct coating process. The polyurethane films prepared with this dispersion by known processes are coloured uniformly and free from specks.

EXAMPLE 3

3 kg of pigment-binder from Example 1 are diluted with 1 kg of cyclohexanone, 6 kg of iron oxide red pigment are introduced and the mixture is stirred at 2,000 revolutions/minute for 15 minutes, using a dissolver. The pigment dispersion is then ground once or twice on a bead mill with glass beads of 1 mm diameter, whilst cooling, until the required tinctorial strength and hiding power are achieved.

In order to obtain colour pastes of the same viscosity with other inorganic pigments, it is necessary to adjust the ratio of pigment:binder and solvent to suit the particular pigment.

EXAMPLE 4

12 kg of Pigment Yellow 116 are introduced into 3.06 kg of pigment-binder from Example 1, diluted with 5.74 kg of cyclohexanone, and the mixture is stirred at 2,000 revolutions/minute for 20 minutes, using a dissolver. The pigment dispersion is then ground once or twice on a bead mill with glass beads of 1 mm diameter, whilst cooling, until the required tinctorial strength and brilliance are achieved.

Equally good pigment formulations are obtained if other organic pigments are employed instead of Pigment Yellow 116. In order to obtain colour pastes of the same consistency, it is necessary, as described in the case of the inorganic pigments in Example 3, to adjust the ratio of pigment:binder and solvent to suit the particular pigment.

For pigmenting collodion varnishes (see the use in Example 1) or polyurethane solutions (see the use in Examples 1 and 2), these pigment formulations are employed either alone or in combination with the carbon black pigment formulation described in Example 1 or with the titanium dioxide pigment formulation (Example 2) or with the inorganic pigment formulations from Example 3. All the colour pastes are readily miscible with one another, without signs of flocculation or flooding; as a result of this, contact marks, colour streaks or variations in the colour shade do not occur during reverse coating. The shades obtained with the pigment formulations are easily reproducible at all times.

EXAMPLE 5

The pigment formulations listed in Examples 1-4 are very suitable for pigmenting a two-component polyurethane for coating leather by the reverse coating process. The procedure is as follows:

200 g of p-toluylenediamine are dissolved in 800 g of methyl ethyl ketone in the course of 5 minutes, whilst stirring. 200 g of the iron oxide red pigment formulation are added to the yellowish-brown solution. Although this pigment dispersion is as mobile as water and highly reactive, it has a storage stability of several weeks and, after reaction with a polyisocyanate, is very suitable for coating leather by the reverse coating process. The polyurethane films produced with this dispersion by known processes are coloured uniformly and free from specks. The polyisocyanate used is prepared by reacting p-toluylene diisocyanate with a polyester of adipic acid, terephthalic acid and diethylene glycol with an average molecular weight of 1,000–3,000.

We claim:

1. Pigment preparations containing 2–70% by weight, relative to the total preparation, of an inorganic or organic pigment dispersed in a solution of 10 to 49% by weight, relative to the total preparation, of a water-insoluble copolymer in an organic solvent, said copolymer is a copolymer of 40–60% by weight of acrylic acid ethyl ester, 30–50% by weight of methacrylic acid methyl ester and 5–15% by weight of acrylic acid hydroxyethyl and/or hydroxypropyl ester or methacrylic acid hydroxyethyl and/or hydroxypropyl ester and being prepared at 50°–170° C. in the presence of 0.5–5.0% by weight, relative to the sum of the monomers, of an organic per-compound or an azo compound which supplies free radicals at 50°–170° C., in an organic solvent.

2. Pigment preparations according to claim 1, wherein the solvent of the preparations is cyclohexanone, dimethylformamide or ethylglycol.

3. Pigment preparations according to claim 1, wherein the solvent for the production of the polymer is cyclohexanone, dimethylformamide or ethylglycol.

4. Pigment preparations according to claim 1, wherein the polymer has a softening point of −5° to +25° C.

5. A composition for dressing leather and imitation leather comprising an organic dressing agent and the pigment preparation of claim 1.

6. A composition according to claim 5 wherein said dressing agent comprises an aromatic or aliphatic polyurethane single component binder system.

7. A composition according to claim 5 wherein said dressing agent comprises a two-component binder system containing an amine.

8. A composition according to claim 5 wherein said dressing agent comprises a lacquer based on a cellulose derivative.

* * * * *